(12) United States Patent
Werth

(10) Patent No.: US 9,510,588 B2
(45) Date of Patent: Dec. 6, 2016

(54) GAME CALL

(71) Applicant: John C. Werth, Knob Noster, MO (US)

(72) Inventor: John C. Werth, Knob Noster, MO (US)

( * ) Notice: Subject to any disclaimer, the term of this patent is extended or adjusted under 35 U.S.C. 154(b) by 0 days.

(21) Appl. No.: 14/692,376

(22) Filed: Apr. 21, 2015

(65) Prior Publication Data
US 2016/0174540 A1 Jun. 23, 2016

Related U.S. Application Data

(60) Provisional application No. 62/096,151, filed on Dec. 23, 2014.

(51) Int. Cl.
*A63H 5/00* (2006.01)
*A01M 31/00* (2006.01)
*G10K 5/00* (2006.01)

(52) U.S. Cl.
CPC .............. *A01M 31/004* (2013.01); *G10K 5/00* (2013.01)

(58) Field of Classification Search
CPC ...................... A01M 31/004; A63B 2071/0625
USPC .................................................. 446/201–209
See application file for complete search history.

(56) References Cited

U.S. PATENT DOCUMENTS

| | | | |
|---|---|---|---|
| 4,940,451 A | 7/1990 | Leady | |
| 6,152,798 A | 11/2000 | Raburn | |
| 6,234,859 B1 | 5/2001 | Primos et al. | |
| 6,234,860 B1 | 5/2001 | Cook | |
| 6,435,933 B1 | 8/2002 | Browne | |
| 7,011,564 B2 * | 3/2006 | Ady | A01M 31/004 446/207 |
| 7,384,323 B2 | 6/2008 | Sceery | |
| 7,465,216 B2 * | 12/2008 | Iwasaki | B24B 37/04 451/446 |
| 7,637,795 B1 * | 12/2009 | Dukart | A01M 31/004 446/207 |
| 7,658,660 B1 | 2/2010 | Drury | |
| 8,016,637 B2 * | 9/2011 | Pribbanow | A01M 31/004 446/202 |
| 2003/0082988 A1 * | 5/2003 | Gendron | A01M 31/004 446/207 |

* cited by examiner

Primary Examiner — Nini Legesse
(74) Attorney, Agent, or Firm — Young Basile Hanlon & MacFarlane, P.C.

(57) ABSTRACT

An air operated game call includes a tone board, a reed and a tubular housing having an interior surface. The interior surface defines an air channel sized for housing the tone board and the reed, and includes at least one portion with transversely extending corrugations.

13 Claims, 8 Drawing Sheets

GAME CALL

CROSS REFERENCE TO RELATED APPLICATIONS

This application claims priority to U.S. Provisional Patent Application No. 62/096,151, filed Dec. 23, 2014, which is incorporated herein by reference in its entirety.

TECHNICAL FIELD

This disclosure generally relates to air operated reed-based game calls used for simulating the sounds of game animals.

BACKGROUND

Air operated game calls are used in a variety of pursuits for simulating the sounds of game animals. Of these, reed-based game calls are a popular choice of hunters for simulating the sounds of a variety of game animals, including waterfowl such as ducks and geese.

In a common configuration of a reed-based game call, the game call includes an elongate tubular housing that houses a reed system. The reed system includes a tone board and a reed, and is generally configured to support the game call's production of sounds that simulate those of game animals. The tone board defines a sound channel and a tone board surface that borders the sound channel and faces a portion of the interior surface of the tubular housing. The sound channel provides fluid communication through the tone board from a mouthpiece end of the tubular housing to an opposing exhaust end.

The reed is held to rest on the tone board surface, and to operate the game call, a caller blows air into the tubular housing at the mouthpiece end. The resulting passage of air through the sound channel vibrates the reed against the tone board surface to generate sounds that drive the game call's production of sounds that simulate those of game animals.

SUMMARY

Disclosed herein are examples of air operated game calls.

In one aspect, an air operated game call includes a tone board, a reed and a tubular housing having an interior surface. The interior surface defines an air channel sized for housing the tone board and the reed, and includes at least one portion with transversely extending corrugations.

In another aspect, an air operated game call includes a tone board, a reed and a tubular housing having an interior surface. The interior surface defines an air channel sized for housing the tone board and the reed at a medial segment of the housing. The interior surface further defines at least one transversely extending valley located upstream of the medial segment.

In yet another aspect, an air operated game call includes a tone board, a reed and a tubular housing having an interior surface. The tone board has a base and defines a tone board surface opposite the base. The reed is sized for positioning over the tone board surface. The interior surface defines an air channel sized for housing the tone board and the reed. The interior surface includes a first circumferential portion and an opposing second circumferential portion, and the first circumferential portion is shaped to mateably engage the base. With the first circumferential portion mateably engaging the base, the second circumferential portion faces the tone board surface, and a passageway open to the second circumferential portion is defined between the first circumferential portion and the base.

These and other aspects will be described in additional detail below.

BRIEF DESCRIPTION OF THE DRAWINGS

The various features, advantages and other uses of the present apparatus will become more apparent by referring to the following detailed description and drawings in which.

DETAILED DESCRIPTION

In the common configuration of the reed-based game call, the interior surface of the tubular housing is substantially smooth. The smooth interior surface of the tubular housing has proven satisfactory for supporting the game call's production of sounds that simulate those of game animals. Game calls are described herein where one or more portions of the interior surface of the tubular housing are corrugated. These game calls have been found to produce sounds that even more realistically simulate those of game animals.

In the common configuration of the reed-based game call, the tone board, opposite its tone board surface, has a radially outer base that is generally shaped to mate with a circumferential portion of the interior surface of the tubular housing. This results in a tight juncture between the sound board surface and the interior surface of the tubular housing that, advantageously, is substantially fluid tight. However, moisture or debris, or both, have the tendency to collect at the juncture and accumulate, for example, between the tone board surface and the reed. Game calls are described herein where one or more passages for moisture or debris are defined between the tone board's base and the interior surface of the tubular housing. In a non-limiting example, a passage can be defined at a valley of the corrugated interior surface of the tubular housing located between the tone board's base and successive ridges. Game calls are also described herein where one or more traps for moisture or debris are defined at other portions of the interior surface of the tubular housing. In a non-limiting example, the one or more traps can be defined at a valley and successive ridges of the corrugated interior surface of the tubular housing.

Figure 1:
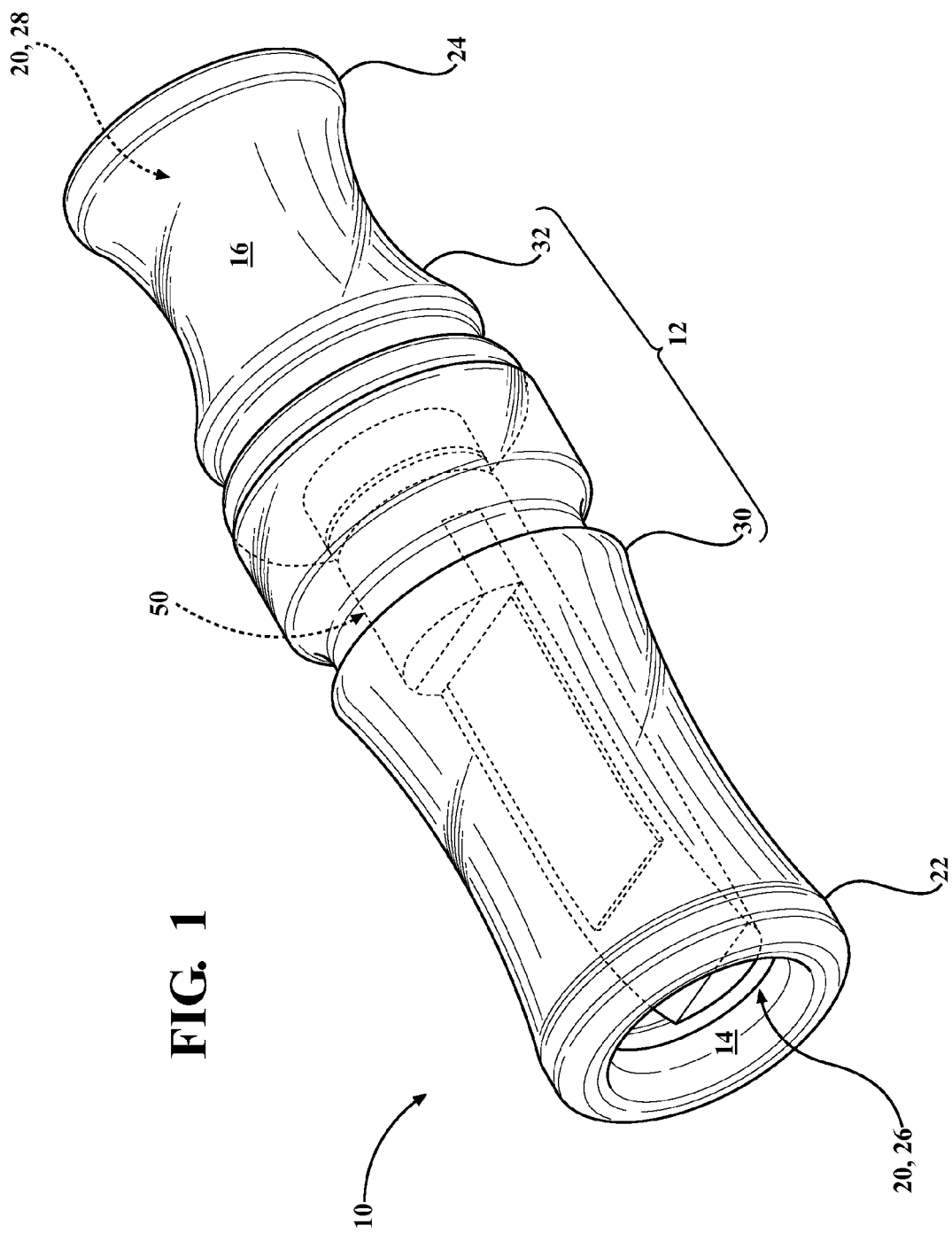
FIG. 1 is a perspective view of an example of an air operated, reed-based game call including an elongate tubular housing that houses a reed system.
Figure 2:
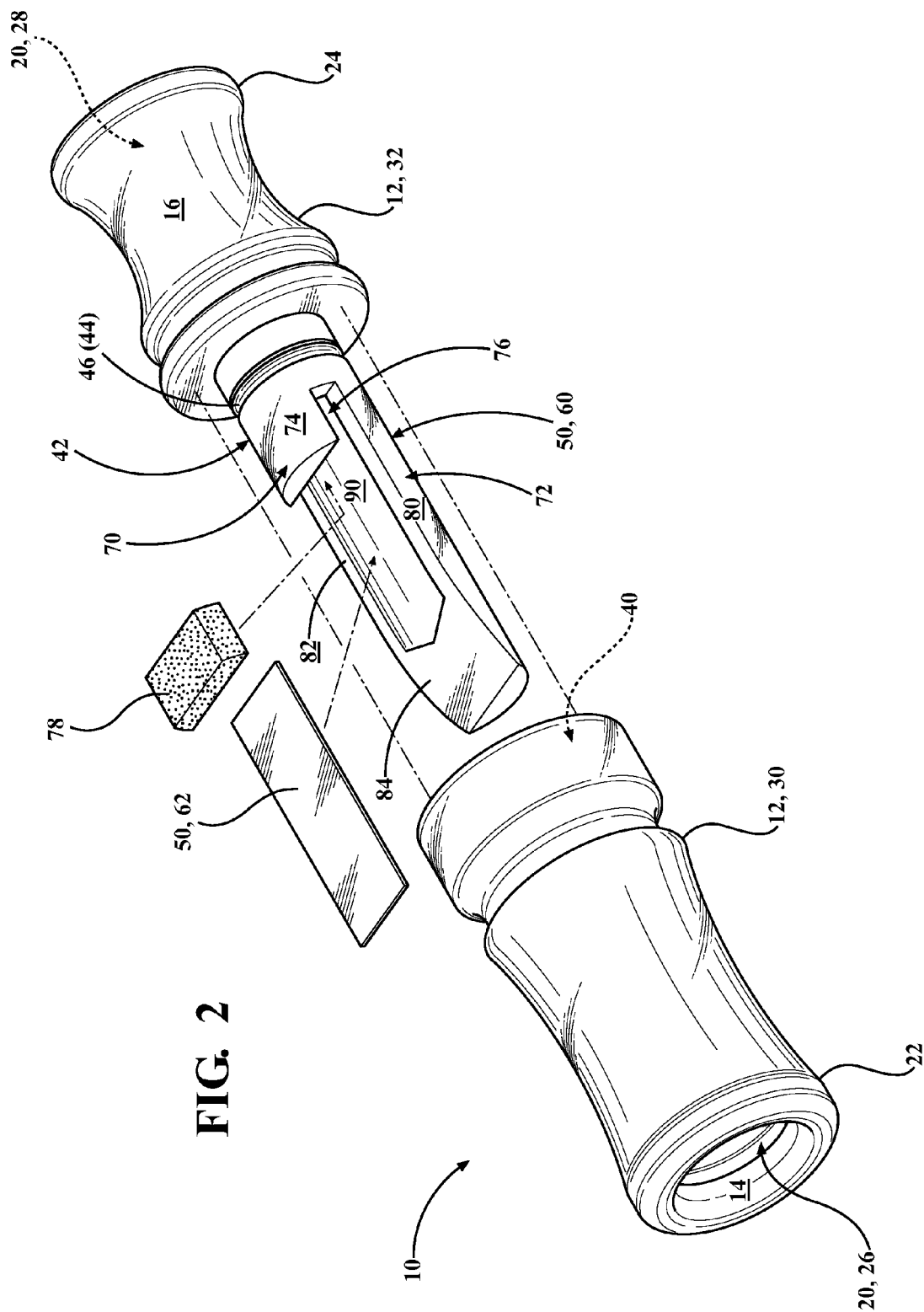
FIG. 2 is a perspective assembly view of the example reed-based game call shown in FIG. 1.

One example of an air operated, reed-based game call 10 is shown in FIGS. 1 and 2. The game call 10 includes an elongate tubular housing 12 that houses a reed system 50. The tubular housing 12 is a rigid, tubular structure that may, as shown, have a generally cylindrical shape. The tubular housing 12 has an interior surface 14 and an outer surface 16. Optionally, the outer surface 16 may be contoured, as generally shown, or have other decorative features.

The interior surface 14 of the tubular housing 12 defines an open ended air channel 20 extending longitudinally through the tubular housing 12. The tubular housing 12 has a mouthpiece end 22 and an opposing exhaust end 24, with the air channel 20 opening to an air intake port 26 at the mouthpiece end 22, and opening to an exhaust port 28 at the opposing exhaust end 24.

The tubular housing 12 may have a one piece construction, or, as generally shown, may be implemented with a multiple piece construction. For instance, in the illustrated example of the tubular housing 12, the tubular housing 12 implements a two piece construction including a barrel 30 and an insert 32. In this example, the barrel 30 forms the mouthpiece end 22 of the tubular housing, and the insert 32 forms the exhaust end 24.

The barrel 30, opposite its mouthpiece end 22, and the insert 32, opposite its exhaust end 24, may respectively include complementary features for removably joining the barrel 30 and the insert 32 to complete the open ended air channel 20 of the tubular housing 12 through the barrel 30 and the insert 32. For instance, with additional reference to FIG. 3, the barrel 30, opposite its mouthpiece end 22, may form a socket 40 sized for receiving a necked down portion 42 of the insert 32 formed opposite its exhaust end 24. As shown, the necked down portion 42 of the insert 32 may define one or more grooves 44 for accommodating a respective one or more sealing rings 46, with the sealing rings 46 sitting flush with or projecting slightly beyond the remainder of the necked down portion 42 in order to support the formation of a fluid tight seal between the socket 40 of the barrel 30 and the necked down portion 42 of the insert 32.

The reed system 50 and other aspects of the game call 10, such as the tubular housing 12, can be adapted to simulate the sounds of a variety of game animals, including without limitation waterfowl. The example game call 10, for instance, has a tubular housing 12 and includes a reed system 50 collaboratively adapted to generally simulate the sounds of ducks.

The reed system 50 is positioned in the tubular housing 12, and is generally configured to support the production by the game call 10 of sounds that simulate those of game animals, such as ducks.

Figure 3:
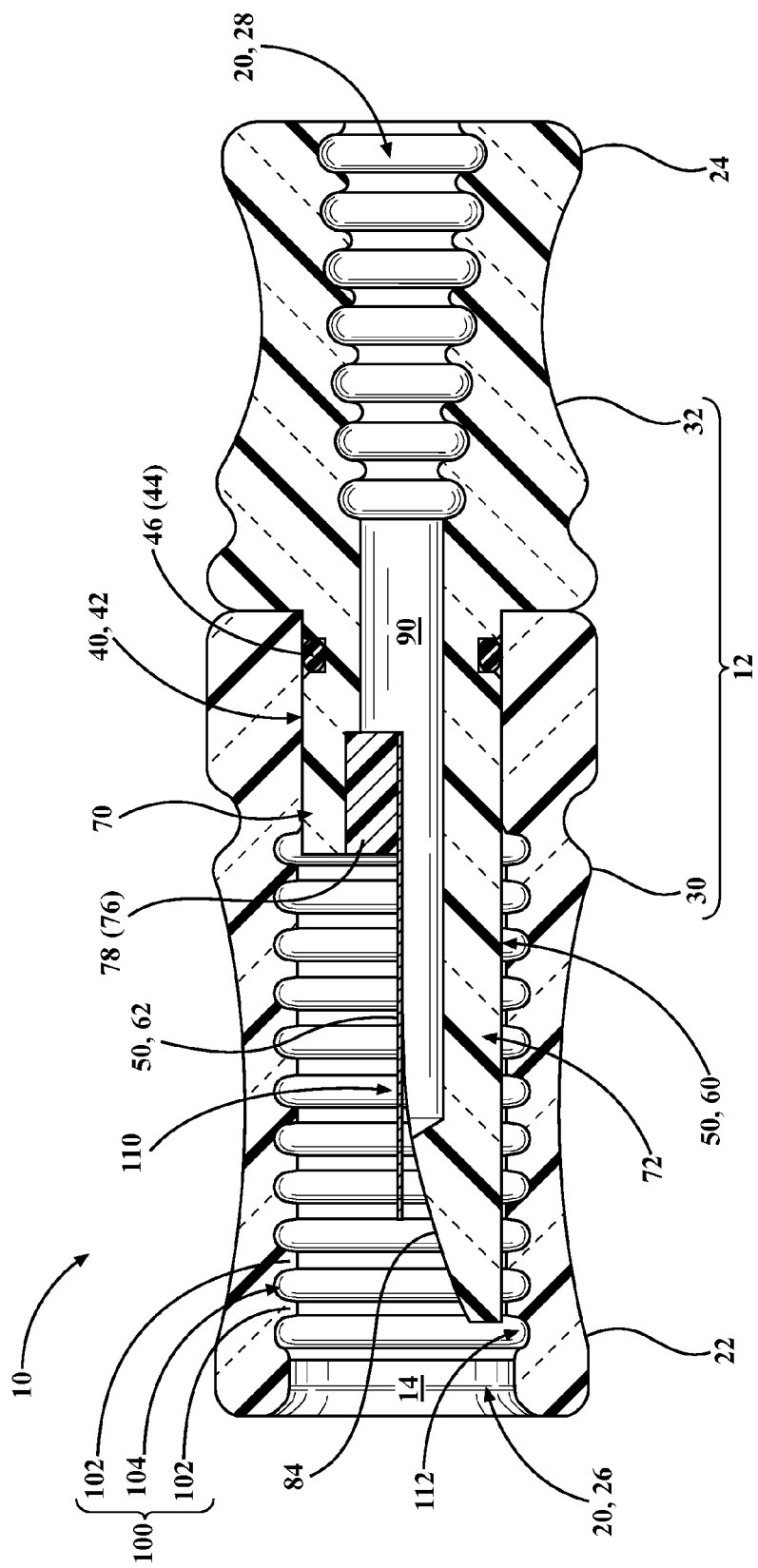
FIG. 3 is a side cross sectional view of the example reed-based game call shown in FIG. 1.

As shown in FIGS. 2 and 3, the reed system 50 includes a tone board 60 and a reed 62. The tone board 60 is positioned in the air channel 20 defined by the interior surface 14 of the tubular housing 12, at a medial segment of the tubular housing 12 between the air intake port 26 at its mouthpiece end 22 and the exhaust port 28 at its opposing exhaust end 24.

The tone board 60 generally includes a wedge portion 70 and a tone board portion 72. The wedge portion 70 is generally shaped and sized for spanning the air channel 20, and defines a radially outer surface 74 that is shaped to mate with the interior surface 14 of the tubular housing 12 defining the air channel 20. As such, with the tone board 60 positioned in the air channel 20, the interior surface 14 of the tubular housing 12 generally circumscribes the radially outer surface 74 of the wedge portion 70 in mateable engagement. This results in a tight, substantially fluid tight fit between the wedge portion 70 and the interior surface 14 of the tubular housing 12.

The tone board portion 72 is generally shaped and sized for occupying a partial portion of the air channel 20. The tone board portion 72 includes a radially outer base 80 that is generally shaped to mate with a partial circumferential portion of the interior surface 14 of the tubular housing 12, and a tone board surface 82 that faces the remainder of the interior surface 14. With the tone board 60 positioned within the air channel 20, a partial circumferential portion of the interior surface 14 of the tubular housing 12 generally circumscribes the radially outer base 80 of the tone board portion 72 in mateable engagement, and the tone board surface 82 extends across the air channel 20 between opposed segments of the interior surface 14 of the tubular housing 12.

In the example game call 10, the tone board 60 is integral with the insert 32. The tone board portion 72 extends upstream from the wedge portion 70 into the air channel 20 towards the mouthpiece end 22 of the tubular housing 12. A leading edge 84 of the tone board portion 72 may be tapered toward the interior surface 14 of the tubular housing 12. In this example, at the leading edge 84 of the tone board portion 72, the tone board surface 82 is canted towards the interior surface 14 of the tubular housing 12. At the remainder of the tone board portion 72, the tone board surface 82 is generally flat.

The tone board 60 defines a sound channel 90 providing fluid communication through the tone board 60 between the air intake port 26 at the mouthpiece end 22 of the tubular housing 12 and the exhaust port 28 at its opposing exhaust end 24. At the wedge portion 70, the sound channel 90 is generally closed and extends longitudinally through the tone board 60, while at the tone board portion 72, the sound channel 90 continues as a generally open trough bordered on both sides by the tone board surface 82. As shown, the sound channel 90 terminates before the leading edge 84 of the tone board portion 72.

The reed 62 is positioned to extend over the tone board portion 72 and rest on the tone board surface 82.

In the example game call 10, a downstream end of the reed 62 is held by the wedge portion 70 of the tone board 60, while the remainder of the reed 62 resting on the tone board surface 82 is generally free. In this example, the wedge portion 70 of the tone board 60 defines a transverse recess 76. The downstream end of the reed 62 is positioned within the recess 76, and to hold it, a retainer 78 is lodged into the remainder of the recess 76. The retainer 78 when lodged contiguously forms a portion of the radially outer surface 74 of the wedge portion 70 that is shaped to mate with the interior surface 14 of the tubular housing 12 defining the air channel 20.

To operate the game call 10, a caller blows air into the tubular housing 12 at its mouthpiece end 22. The resulting passage of air into the air channel 20 from the air intake port 26, and ultimately, through the sound channel 90 and out the exhaust port 28 at the opposing exhaust end 24 of the tubular housing 12, vibrates the reed 62 against the tone board surface 82, which generates sounds that drive the production by the game call 10 of sounds that simulate those of game animals.

In the game call 10, one or more portions of the interior surface 14 of the tubular housing 12 defining the air channel 20 are corrugated. The corrugated portions of the interior surface 14 of the tubular housing 12 include corrugations 100 having alternating ridges 102 and valleys 104, with each valley 104 defined between adjacent ridges 102. Although the ridges 102 and valleys 104 are shown as forming a continuous and generally sinusoidal surface, the ridges 102 and valleys 104 could alternatively form a surface corresponding to a square wave or a triangular wave, for example.

As shown, the corrugations 100 may generally extend transversely to the tubular housing 12. According to the illustrated example, for instance, the corrugations 100 may extend circumferentially.

The interior surface 14 of the tubular housing 12 may be corrugated along one, some or all of its segments. Along these segments, one, some or all of the circumferential portions of the interior surface 14 of the tubular housing 12 may be corrugated. The interior surface 14 may, for instance, be corrugated along substantially its entire length and along substantially its entire circumference. As generally shown, the interior surface 14 may optionally not be corrugated along the medial segment of its length where its circumferential portion mates with the radially outer surface 74 of the wedge portion 70.

According to the illustrated example, the interior surface 14 of the barrel 30 or the interior surface 14 of the insert 32, or both, may be corrugated. For instance, the interior surface 14 of the tubular housing 12 may be corrugated along the circumferential portion of the interior surface 14 facing the tone board surface 82 defined by the tone board portion 72. Additionally, or alternatively, the interior surface 14 of the tubular housing 12 may be corrugated along the circumferential portion of the interior surface 14 mating with the radially outer base 80 of the tone board portion 72. Additionally, or alternatively, one, some or all of the circumferential portions of the interior surface 14 of the tubular housing 12 may be corrugated along the segments upstream of the positioning of the tone board 60 in the air channel 20 defined by the interior surface 14, up to an including the air intake port 26 at the mouthpiece end 22 of the tubular housing 12. Additionally, or alternatively, one, some or all of the circumferential portions of the interior surface 14 of the tubular housing 12 may be corrugated along the segments downstream of the positioning of the tone board 60 in the air channel 20 defined by the interior surface 14, up to an including the exhaust port 28 at the opposing exhaust end 24 of the tubular housing 12.

The game call 10, where one or more portions of the interior surface 14 of the tubular housing 12 defining the air channel 20 are corrugated, has been found to advantageously produce sounds that more realistically simulate those of game animals, particularly with respect to the pitch of the produced sounds, as compared, for example, to an otherwise generally similar game call where the interior surface of the tubular housing is substantially smooth.

In operation of the game call 10, the rapid and repeated blowing of air into the tubular housing 12 at its mouthpiece end 22 introduces moisture into the air channel 20. Moreover, in field use, the game call 10 may be susceptible to the introduction of debris into the air channel 20. As pointed out above, with the tone board 60 positioned within the air channel 20, a partial circumferential portion of the interior surface 14 of the tubular housing 12 generally circumscribes the radially outer base 80 of the tone board portion 72 in mateable engagement, and the tone board surface 82 extends across the air channel 20 between opposed segments of the interior surface 14 of the tubular housing 12. This results in a tight juncture between the sound board surface 82 and the interior surface 14 of the tubular housing 12 that, advantageously, is substantially fluid tight. However, moisture and debris introduced into the air channel 20 have the tendency to collect at the juncture and accumulate between the tone board surface 82 and the reed 62, which can adversely affect the production by the game call 10 of sounds that simulate those of game animals.

Figure 4:
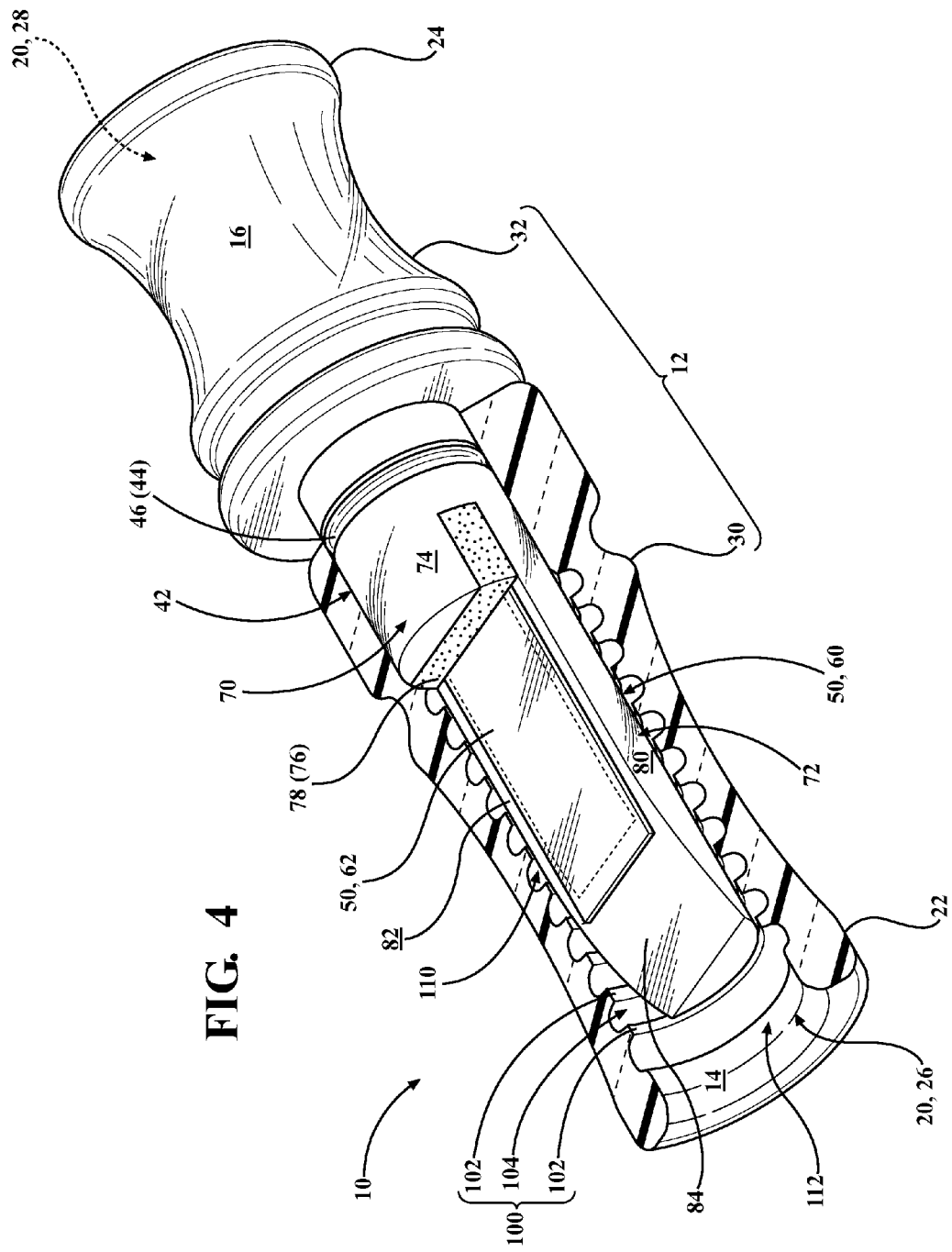
FIG. 4 is a partially broken away perspective view of the example reed-based game call shown in FIG. 1.

As shown with additional reference to FIG. 4, in the game call 10, one or more passages 110 are open to the air channel 20 and defined between the radially outer base 80 of the tone board portion 72 and the interior surface 14 of the tubular housing 12. The passages 110 allow the passage of moisture or debris, or both, in the air channel 20 past the juncture between the sound board surface 82 and the interior surface 14 of the tubular housing 12, and for the collection of the moisture or debris between the radially outer base 80 of the tone board portion 72 and the interior surface 14 of the tubular housing 12 for subsequent removal.

According to the illustrated example of the game call 10, the interior surface 14 of the tubular housing 12 may be corrugated along the circumferential portion of the interior surface 14 mating with the radially outer base 80 of the tone board portion 72, and a passage 110 can be defined at a valley 104 located between the radially outer base 80 of the tone board portion 72 and successive ridges 102. In other examples, it will be understood that one, some or all of the one or more passages 110 can otherwise be open to the air channel 20 and defined between the interior surface 14 of the tubular housing 12 and the radially outer base 80 of the tone board portion 72.

Alternatively, or additionally to the one or more passages 110, one or more traps 112 for moisture or debris, or both, in the air channel 20 may be defined at portions of the interior surface 14 of the tubular housing 12 other than the circumferential portion of the interior surface 14 mating with the radially outer base 80 of the tone board portion 72. In the game call 10, the interior surface 14 of the tubular housing 12 may be corrugated along one, some or all of its segments, and along these segments, one, some or all of the circumferential portions of the interior surface 14 of the tubular housing 12 may be corrugated. According to the illustrated example of the game call 10, a trap 112 can be defined at a valley 104 defined between successive ridges 102 at these portions of the corrugated interior surface 14 of the tubular housing 12. In other examples, it will be understood that one, some or all of the one or more traps 112 can otherwise be defined.

Figure 5:
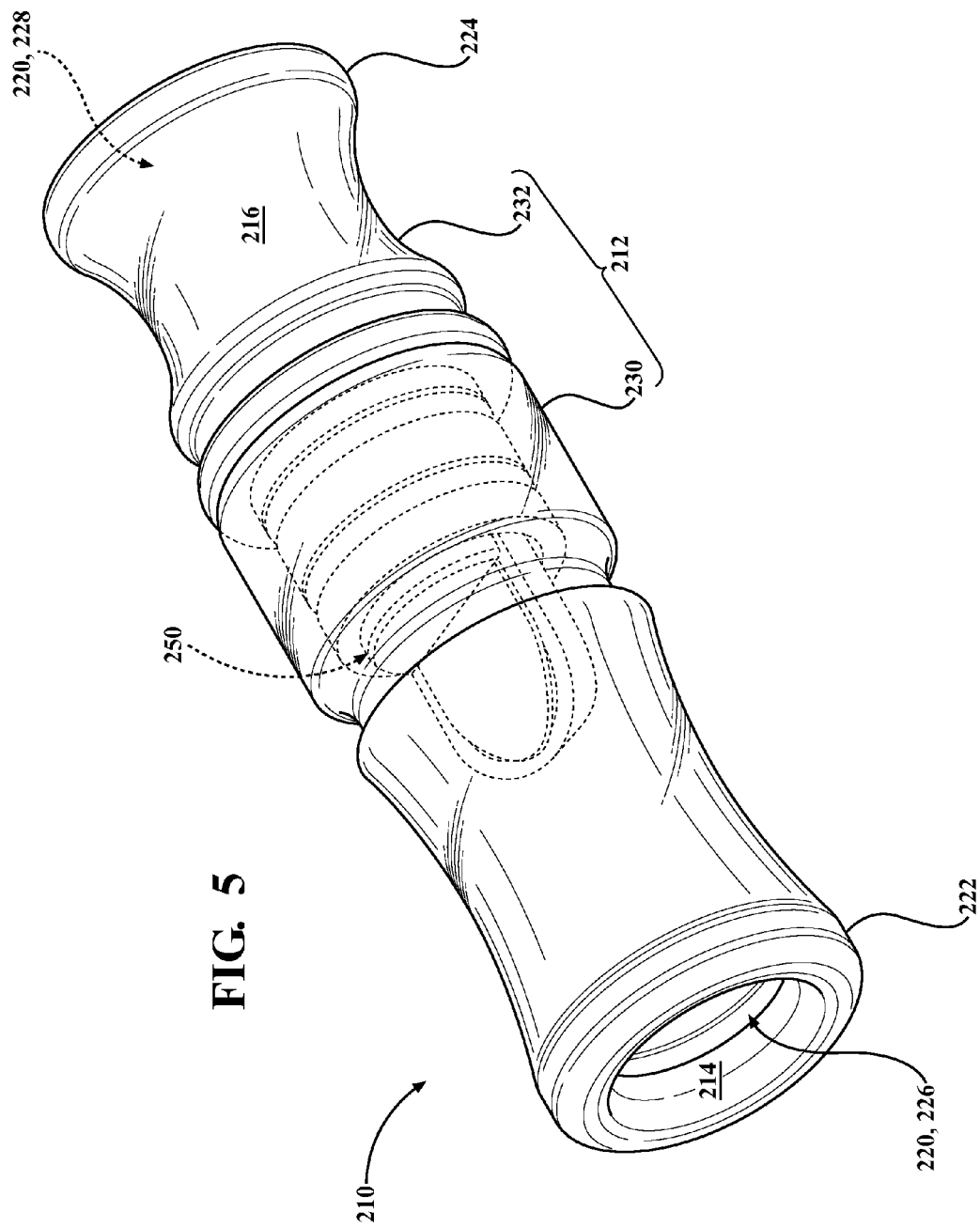
FIG. 5 is a perspective view of another example of an air operated, reed-based game call including an elongate tubular housing that houses a reed system.
Figure 6:
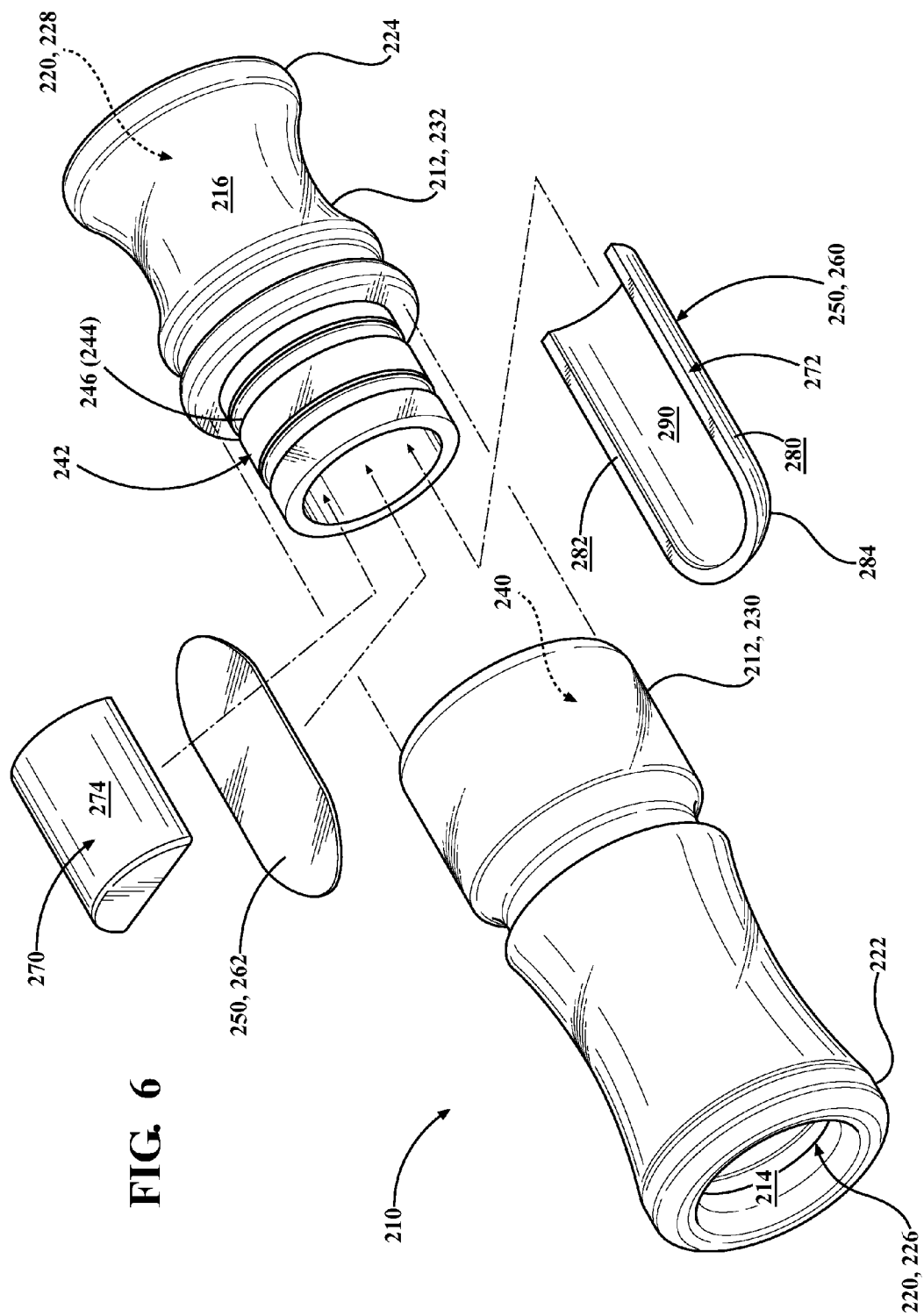
FIG. 6 is a perspective assembly view of the example reed-based game call shown in FIG. 5.

Another example of an air operated, reed-based game call 210 is shown in FIGS. 5 and 6. Similarly to the game call 10, the game call 210 includes an elongate tubular housing 212 that houses a removable reed system 250. The tubular housing 212 is a rigid, tubular structure that may, as shown, have a generally cylindrical shape. The tubular housing 212 has an interior surface 214 and an outer surface 216. Optionally, the outer surface 216 may be contoured, as generally shown, or have other decorative features.

The interior surface 214 of the tubular housing 212 defines an open ended air channel 220 extending longitudinally through the tubular housing 212. The tubular housing 212 has a mouthpiece end 222 and an opposing exhaust end 224, with the air channel 220 opening to an air intake port 226 at the mouthpiece end 222, and opening to an exhaust port 228 at the opposing exhaust end 224.

The tubular housing 212 may have a one piece construction, or, as generally shown, may be implemented with a multiple piece construction. For instance, in the illustrated example of the tubular housing 212, the tubular housing 212 implements a two piece construction including a barrel 230 and an insert 232. In this example, the barrel 230 forms the mouthpiece end 222 of the tubular housing, and the insert 232 forms the exhaust end 224.

The barrel 230, opposite its mouthpiece end 222, and the insert 224, opposite its exhaust end 224, may respectively include complementary features for removably joining the barrel 230 and the insert 232 to complete the open ended air channel 220 of the tubular housing 212 through the barrel 230 and the insert 232. For instance, with additional reference to FIG. 7, the barrel 230, opposite its mouthpiece end 222, may form a socket 240 sized for receiving a necked down portion 242 of the insert 232 formed opposite its exhaust end 224. As shown, the necked down portion 242 of the insert 232 may define one or more grooves 244 for accommodating a respective one or more sealing rings 246, with the sealing rings 246 sitting flush with or projecting slightly beyond the remainder of the necked down portion 242 in order to support the formation of a fluid tight seal between the socket 240 of the barrel 230 and the necked down portion 242 of the insert 232.

The reed system 250 and other aspects of the game call 210, such as the tubular housing 212, can be adapted to simulate the sounds of a variety of game animals, including without limitation waterfowl. The example game call 210, for instance, has a tubular housing 212 and a reed system 250 collaboratively adapted to generally simulate the sounds of geese.

The reed system 250 (sometimes referred to as a "gut system") is removably positioned in the tubular housing 212, and is generally configured to support the production by the game call 210 of sounds that simulate those of game animals, such as geese.

Figure 7:
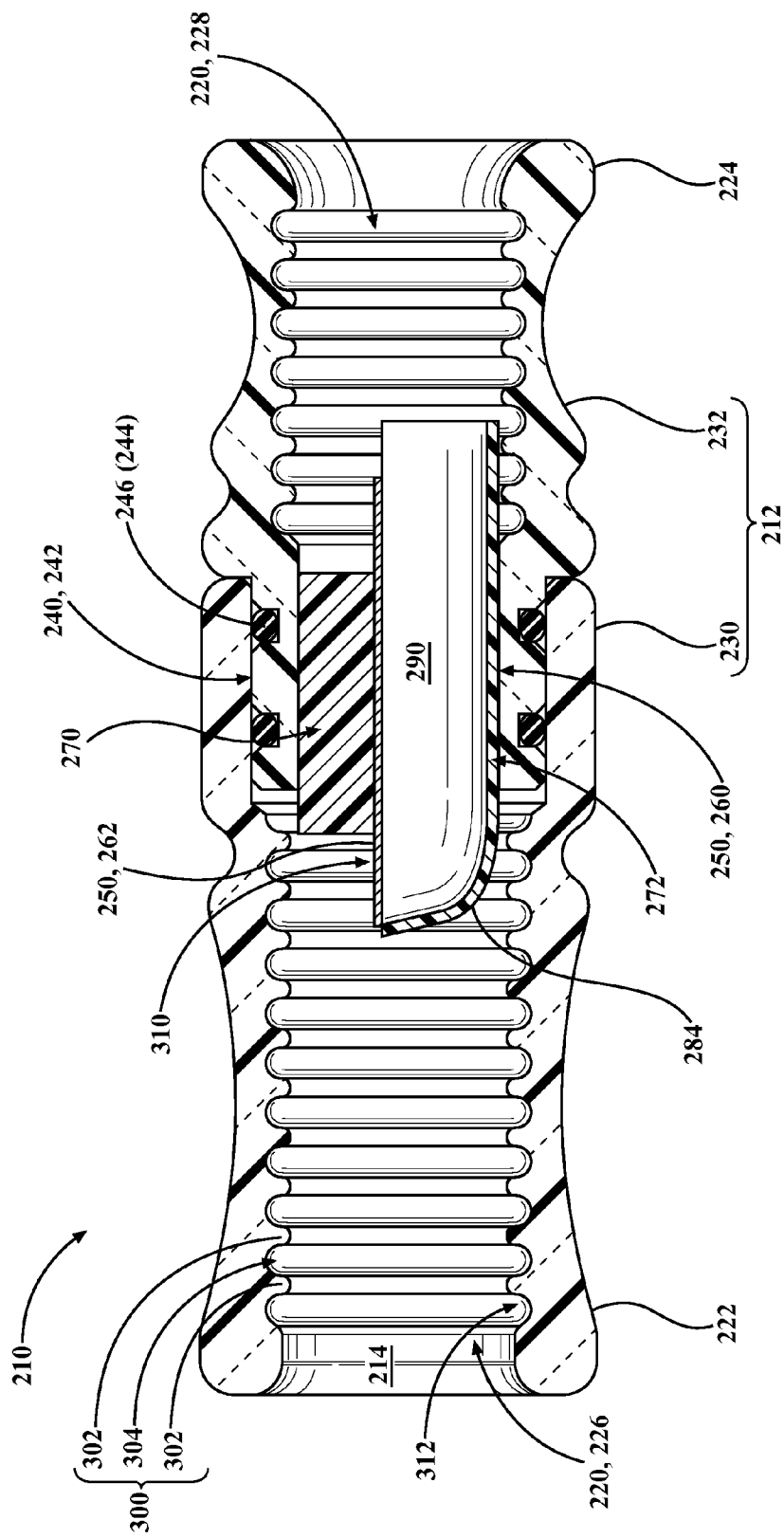
FIG. 7 is a side cross sectional view of the example reed-based game call shown in FIG. 5.

As shown in FIGS. 6 and 7, the reed system 250 includes a tone board 260 and a reed 262. The tone board 260 is positioned in the air channel 220 defined by the interior surface 214 of the tubular housing 212, at a medial segment of the tubular housing 212 between the air intake port 226 at its mouthpiece end 222 and the exhaust port 228 at its opposing exhaust end 224.

The tone board 260 generally includes a wedge portion 270 and a tone board portion 272. The wedge portion 270 is generally shaped and sized for spanning the air channel 220, and defines a radially outer surface 274 that is shaped to mate with the interior surface 214 of the tubular housing 212 defining the air channel 220. As such, with the tone board 260 positioned in the air channel 220, the interior surface 214 of the tubular housing 212 generally circumscribes the radially outer surface 274 of the wedge portion 270 in mateable engagement. This results in a tight, substantially fluid tight fit between the wedge portion 270 and the interior surface 214 of the tubular housing 212.

The tone board portion 272 is generally shaped and sized for occupying a partial portion of the air channel 220. The tone board portion 272 includes a radially outer base 280 that is generally shaped to mate with a partial circumferential portion of the interior surface 214 of the tubular housing 212, and a tone board surface 282 that faces the remainder of the interior surface 214. With the tone board 260 positioned within the air channel 220, a partial circumferential portion of the interior surface 214 of the tubular housing 212 generally circumscribes the radially outer base 280 of the tone board portion 272 in mateable engagement, and the tone board surface 282 extends across the air channel 220 between opposed segments of the interior surface 214 of the tubular housing 212.

In the example game call 210, the tone board portion 272 underlies the wedge portion and extends upstream from the wedge portion 270 into the air channel 220 towards the mouthpiece end 222 of the tubular housing 212, and downstream from the wedge portion 270 towards its exhaust end 224. A leading edge 284 of the tone board portion 272 may be tapered away from the interior surface 214 of the tubular housing 212. In this example, the tone board surface 282 is generally flat along the length of the tone board portion 272.

The tone board 260 defines a sound channel 290 providing fluid communication through the tone board 260 between the air intake port 226 at the mouthpiece end 222 of the tubular housing 212 and the exhaust port 228 at its opposing exhaust end 224. At the wedge portion 270, the sound channel 290 is generally closed and extends longitudinally through the tone board 260, while at the tone board portion 272, the sound channel 290 continues as a generally open trough bordered on both sides by the tone board surface 282. As shown, the sound channel 290 terminates before the leading edge 284 of the tone board portion 272.

The reed 262 is positioned to extend over the tone board portion 272 and rest on the tone board surface 282.

In the example game call 210, a medial portion of the reed 262 is held by the wedge portion 270 of the tone board 260, while the remainder of the reed 262 resting on the tone board surface 282 is generally free. In this example, to hold the medial portion of the reed 262, the wedge portion 270 of the tone board 260 is a separate piece from the tone board portion 272, and is lodged between the tone board portion 272 and the interior surface 214 of the tubular housing 212 defining the air channel 220.

To operate the game call 210, a caller blows air into the tubular housing 212 at its mouthpiece end 222. The resulting passage of air into the air channel 220 from the air intake port 226, and ultimately, through the sound channel 290 and out the exhaust port 228 at the opposing exhaust end 224 of the tubular housing 212, vibrates the reed 262 against the tone board surface 282, which generates sounds that drive the production by the game call 210 of sounds that simulate those of game animals.

In the game call 210, one or more portions of the interior surface 214 of the tubular housing 212 defining the air channel 220 are corrugated. The corrugated portions of the interior surface 214 of the tubular housing 212 include corrugations 300 having alternating ridges 302 and valleys 304, with each valley 304 defined between adjacent ridges 302. Although the ridges 302 and valleys 304 are shown as forming a continuous and generally sinusoidal surface, the ridges 302 and valleys 304 could alternatively form a surface corresponding to a square wave or a triangular wave, for example. As shown, the corrugations 100 may generally extend transversely to the tubular housing 12. According to the illustrated example, for instance, the corrugations 100 may extend circumferentially.

The interior surface 214 of the tubular housing 212 may be corrugated along one, some or all of its segments. Along these segments, one, some or all of the circumferential portions of the interior surface 214 of the tubular housing 212 may be corrugated. The interior surface 214 may, for instance, be corrugated along substantially its entire length and along substantially its entire circumference. As generally shown, the interior surface 214 may optionally not be corrugated along the medial segment of its length where its circumferential portion mates with the radially outer surface 274 of the wedge portion 270.

According to the illustrated example, the interior surface 214 of the barrel 230 or the interior surface 214 of the insert 232, or both, may be corrugated. For instance, the interior surface 214 of the tubular housing 212 may be corrugated along the circumferential portion of the interior surface 214 facing the tone board surface 282 defined by the tone board portion 272. Additionally, or alternatively, the interior surface 214 of the tubular housing 12 may be corrugated along the circumferential portion of the interior surface 214 mating with the radially outer base 280 of the tone board portion 272. Additionally, or alternatively, one, some or all of the circumferential portions of the interior surface 214 of the tubular housing 212 may be corrugated along the segments upstream of the positioning of the tone board 260 in the air channel 220 defined by the interior surface 214, up to an including the air intake port 226 at the mouthpiece end 222 of the tubular housing 212. Additionally, or alternatively, one, some or all of the circumferential portions of the interior surface 214 of the tubular housing 212 may be corrugated along the segments downstream of the positioning of the tone board 260 in the air channel 220 defined by the interior surface 214, up to an including the exhaust port 228 at the opposing exhaust end 224 of the tubular housing 212.

The game call 210, where one or more portions of the interior surface 214 of the tubular housing 212 defining the air channel 220 are corrugated, has been found to advantageously produce sounds that more realistically simulate those of game animals, particularly with respect to the pitch of the produced sounds, as compared, for example, to an otherwise generally similar game call where the interior surface of the tubular housing is substantially smooth.

In operation of the game call 210, the rapid and repeated blowing of air into the tubular housing 212 at its mouthpiece end 222 introduces moisture into the air channel 220. Moreover, in field use, the game call 210 may be susceptible to the introduction of debris into the air channel 220. As pointed out above, with the tone board 260 positioned within the air channel 220, a partial circumferential portion of the interior surface 214 of the tubular housing 212 generally circumscribes the radially outer base 280 of the tone board portion 272 in mateable engagement, and the tone board surface 282 extends across the air channel 220 between opposed segments of the interior surface 214 of the tubular housing 212. This results in a tight juncture between the sound board surface 282 and the interior surface 214 of the tubular housing 212 that, advantageously, is substantially fluid tight. However, moisture and debris introduced into the air channel 220 have the tendency to collect at the juncture and accumulate between the tone board surface 282 and the reed 262, which can adversely affect the production by the game call 210 of sounds that simulate those of game animals.

Figure 8:
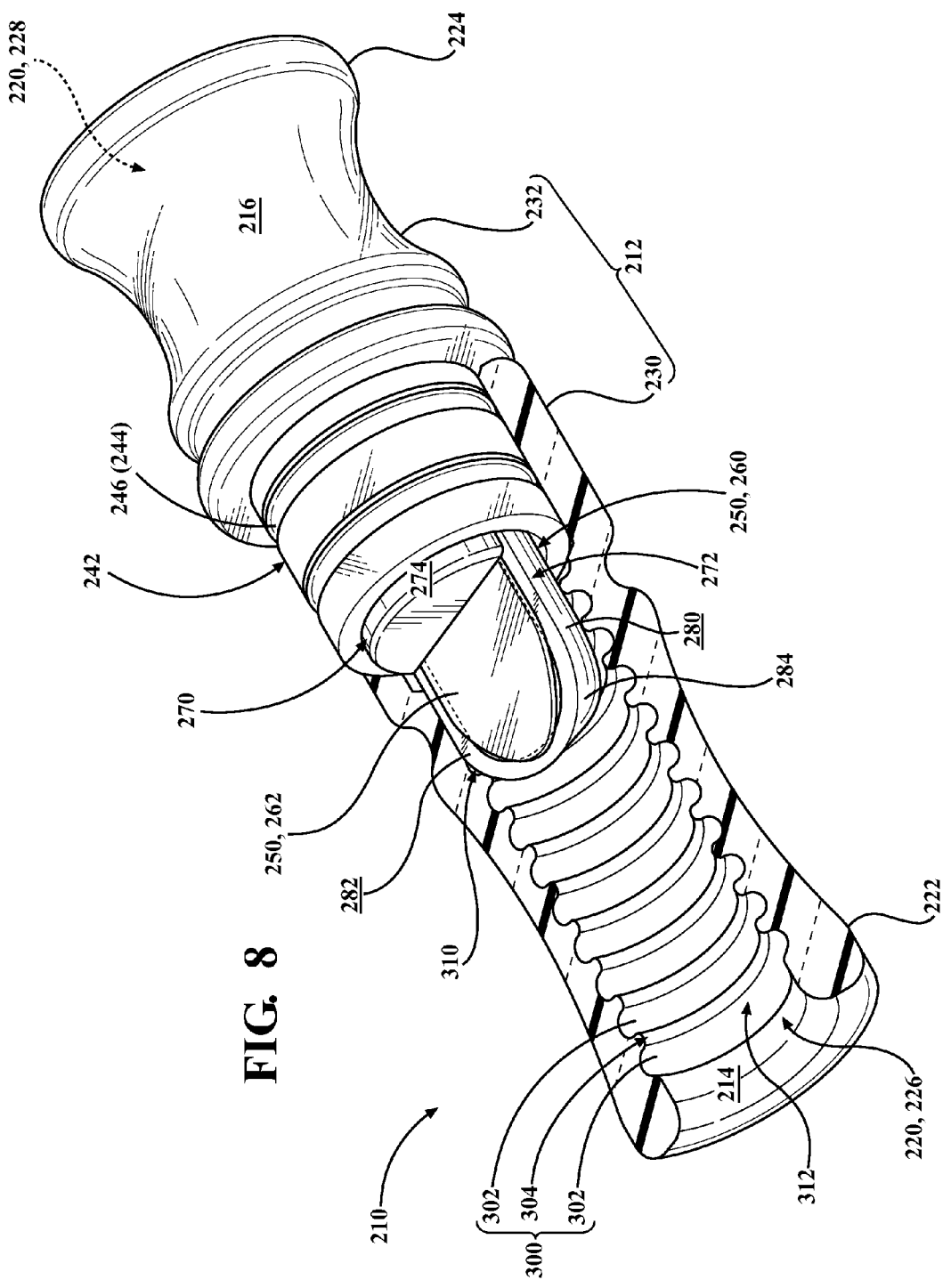
FIG. 8 is a partially broken away perspective view of the example reed-based game call shown in FIG. 5.

As shown with additional reference to FIG. 8, in the game call 210, one or more passages 310 are open to the air channel 220 and defined between the radially outer base 280 of the tone board portion 272 and the interior surface 214 of the tubular housing 212. The passages 310 allow the passage of moisture or debris, or both, in the air channel 220 past the juncture between the sound board surface 282 and the interior surface 214 of the tubular housing 212, and for the collection of the moisture or debris between the radially outer base 280 of the tone board portion 272 and the interior surface 214 of the tubular housing 212 for subsequent removal.

According to the illustrated example of the game call 210, the interior surface 214 of the tubular housing 212 may be corrugated along the circumferential portion of the interior surface 214 mating with the radially outer base 280 of the tone board portion 272, and a passage 310 can be defined at a valley 304 located between the radially outer base 280 of the tone board portion 272 and successive ridges 302. In other examples, it will be understood that one, some or all of the one or more passages 310 can otherwise be open to the air channel 220 and defined between the interior surface 214 of the tubular housing 212 and the radially outer base 280 of the tone board portion 272.

Alternatively, or additionally to the one or more passages 310, one or more traps 312 for moisture or debris, or both, in the air channel 220 may be defined at portions of the interior surface 214 of the tubular housing 212 other than the circumferential portion of the interior surface 214 mating with the radially outer base 280 of the tone board portion 272. In the game call 210, the interior surface 214 of the tubular housing 212 may be corrugated along one, some or all of its segments, and along these segments, one, some or all of the circumferential portions of the interior surface 214 of the tubular housing 212 may be corrugated. According to the illustrated example of the game call 210, a trap 312 can be defined at a valley 304 defined between successive ridges 302 at these portions of the corrugated interior surface 214 of the tubular housing 212. In other examples, it will be understood that one, some or all of the one or more traps 312 can otherwise be defined.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An air operated game call, comprising:
a tone board;
a reed; and
a tubular housing having a mouth piece end, an exhaust end, an interior surface defining an air channel sized for housing the tone board and the reed, and a corrugated segment with transversely extending corrugations along a circumference of the interior surface directly surrounding the tone board.

2. The game call of claim 1, wherein the air channel is sized for housing the tone board and the reed at a medial segment of the housing, and the corrugated segment is located upstream of the medial segment toward the mouth piece end.

3. The game call of claim 1, wherein the air channel is sized for housing the tone board and the reed at a medial segment of the housing, and further including a second corrugated segment is located downstream of the medial segment.

4. The game call of claim 1, wherein the tone board has a base and defines a tone board surface for the reed opposite the base, a circumferential portion of the circumference of the interior surface along the corrugated segment is shaped to mateably engage the base, and with the circumferential portion mateably engaging the base, the transversely extending corrugations define passageways between the circumferential portion and the base.

5. The game call of claim 1, wherein the housing includes a barrel and an insert, the barrel and the insert each having a respective portion of the interior surface, and selectively joinable to define the air channel.

6. The game call of claim 5, wherein the tone board is integral with the insert.

7. The game call of claim 5, wherein the tone board is selectively removable from the housing.

8. An air operated game call, comprising:
a tone board;
a reed; and
a tubular housing having a mouth piece end, an exhaust end, an interior surface defining an air channel sized for housing the tone board and the reed at a medial segment of the housing and extending toward the mouth piece, and a corrugated segment having transversely extending peaks and valleys located between the mouth piece end and the medial segment and surrounding the tone board.

9. The game call of claim 8, wherein the transversely extending peaks and valleys are transversely extending corrugations included in the interior surface and located between the mouth piece end and the medial segment.

10. The game call of claim 9, wherein transversely extending corrugations extend a circumference of the interior surface.

11. The game call of claim 8, wherein the housing includes a barrel and an insert, the barrel and the insert each having a respective portion of the interior surface, and selectively joinable to define the air channel, and wherein the barrel has the portion of the interior surface defining the transversely extending peaks and valleys.

12. An air operated game call, comprising:
a tone board having a base and defining a tone board surface opposite the base;
a reed sized for positioning over the tone board surface; and
a tubular housing having an interior surface having a transversely corrugated segment, the interior surface defining an air channel sized for housing the tone board and the reed at the corrugated segment, a circumferential portion of the circumference of the interior surface along the corrugated segment is shaped to mateably engage the base, and with the circumferential portion mateably engaging the base, the corrugated segment defines passageways between the circumferential portion and the base.

13. The game call of claim 12, wherein the housing includes a barrel and an insert, the barrel and the insert each having a respective portion of the interior surface, and selectively joinable to define the air channel.

* * * * *